United States Patent [19]

Ruelein et al.

[11] Patent Number: 5,503,037
[45] Date of Patent: Apr. 2, 1996

[54] RELEASE DEVICE FOR MECHANICAL ENERGY STORAGE MEANS

[75] Inventors: Hermann Ruelein, Pinneberg-Thesdorf; Alfred Liensdorf, Noderstedt; Bernd Lacher, Agathorst; Peter Eckmann, Hamburg; Hans-Otto Kock, Kaltenkirch, all of Germany

[73] Assignee: Autoliv Development AB, Vargarda, Sweden

[21] Appl. No.: 337,138

[22] Filed: Nov. 10, 1994

Related U.S. Application Data

[62] Division of Ser. No. 850,489, Mar. 12, 1992, Pat. No. 5,377,554.

[30] Foreign Application Priority Data

Sep. 16, 1989 [DE] Germany ............................ 39 30 980.0

[51] Int. Cl.⁶ .................................................. G05G 17/00
[52] U.S. Cl. ........................ 74/2; 280/806; 292/DIG. 22; 297/480
[58] Field of Search .................................. 74/2; 102/252, 102/253, 216, 274; 137/45; 292/DIG. 22; 297/480; 280/806

[56] References Cited

U.S. PATENT DOCUMENTS 3,372,777  3/1968  Filippi et al. ............................ 297/480
4,274,431  6/1981  Keller ....................................... 137/45 X
4,999,004  3/1991  Skanberg et al. ....................... 280/806 X

FOREIGN PATENT DOCUMENTS 300469    1/1989  European Pat. Off. ..
305765    3/1989  European Pat. Off. ..
1187122   3/1959  France ..................................... 137/45
55-109863 8/1980  Japan ....................................... 137/45

Primary Examiner—Allan D. Herrmann
Attorney, Agent, or Firm—Robert W. Becker & Associates

[57] ABSTRACT

A device for releasing a mechanical energy storage device from an initial locked position in a release situation is comprised of a housing having a bearing connected thereto, a locking device for securing the energy storage device in the initial locked position and a supporting device deflectable in the release situation and connected to the bearing. The locking means is connected to the housing and rests on the supporting device in a prestressed manner in the initial locked position, whereby the supporting device is deflected in the release situation by forces created by its own inertia. The supporting device may be in the form of a spring, two springs with an inertia member therebetween, two bodies with an inertia member therebetween, or a ball in a ball socket. Another embodiment uses rollers and roller bearings.

3 Claims, 14 Drawing Sheets

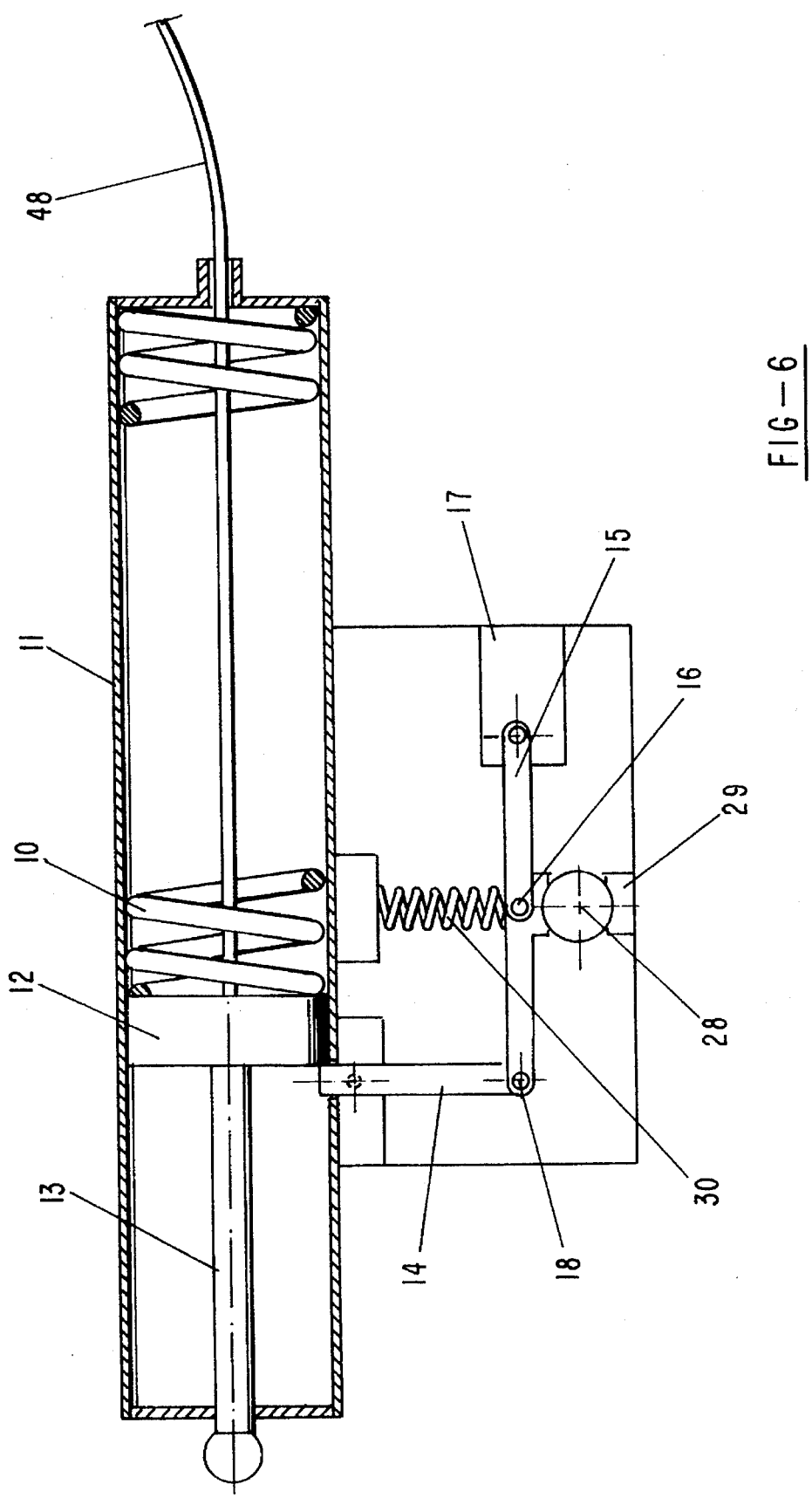

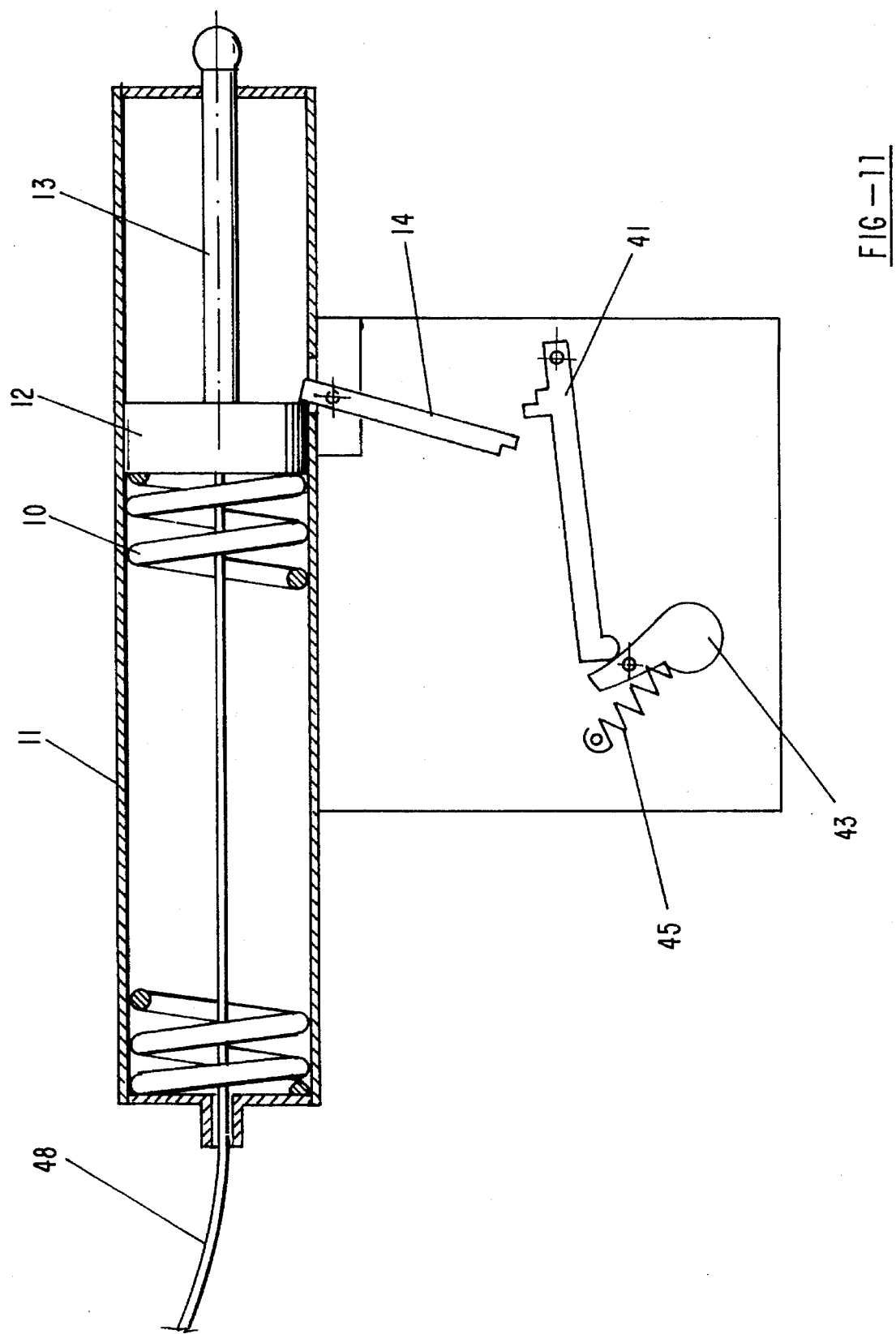

RELEASE DEVICE FOR MECHANICAL ENERGY STORAGE MEANS

This application is a division of application Ser. No. 07/850,489 filed Mar. 12, 1992 now U.S. Pat. No. 5,377,554.

BACKGROUND OF THE INVENTION

The invention relates to a device for releasing a mechanical energy storage means, especially a prestressed spring, in a release situation. Such a device is, for example, required in the field of tensioning devices for safety belts, especially in motor vehicles, in which a prestressed spring is released by a sensor so that the energy stored within the spring may be transmitted into the execution of a tensioning movement of the safety belt.

With such devices in general the following problem is encountered: When employing movable securing members, a considerable friction between the mechanical energy storage means that is secured, respectively, that is to be released, and the securing member, respectively, the components employed for the releasing function must be overcome because the securing member, respectively, the components employed for the releasing function must bear the full force of the energy storage means. A further problem is that the release of the securing member, respectively, the energy storage means must occur within a very short activation time in order to prevent an endangerment of the buckled-in passengers during an accident.

For securing the energy storage means in its locked position, it is also known to provide a locking lever which is resting in a prestressed manner on a supporting means in the locked position, whereby the supporting means is deflectable in the release situation by an acceleration-sensitive release member.

A device of the aforementioned kind employed in safety belts in motor vehicles is described in European patent application 0 305 765. In this known device, the deflectable support for supporting the locking lever which maintains the energy storage means in its locked position is in the form of a vertically arranged sensor lever having, at a free end extending in an upward direction, an inertia member and being supported in its vertical initial position by spring means. The vertically extending sensor lever is coupled via an additional lever system to the locking lever for pivoting it out of its locking position.

The known device has the disadvantage that the arrangement of the sensor lever with its inertia member as the acceleration-sensitive release member for the locking lever and the required mechanical coupling with the locking lever results in a complicated constructive embodiment with plurality of interacting and cooperating components. It is therefore difficult to adjust the threshold for the movement of the locking lever into the release position for the energy storage means and to maintain this threshold with the necessary exactness during operation.

It is known from European patent application 0 300 469 to provide an elbow lever between a locking lever and an inertia sensor, whereby however the inertia sensor is of a complicated construction.

It is therefore an object of the invention to provide a device for releasing a mechanical energy storage means with which a secure and fast release of the mechanical energy storage means is ensured. It is another object of the present invention to simplify design of the acceleration-sensitive release member for the locking lever and to improve the functional reliability of the device.

SUMMARY OF THE INVENTION

The solution to this object together with advantageous embodiments and developments may be taken from the contents of the claims which follow this description.

The inventive device for releasing a mechanical energy storage means from an initial locked position in a release situation is comprised of a housing; a bearing provided at said housing; a locking means for securing the energy storage means in the initial locked position, the locking means connected to the housing; and a supporting means deflectable in the release situation and connected to the bearing, the locking means resting on the supporting means in a prestressed manner in the initial locked position, and the supporting means being deflected in the release situation by forces created by its own inertia.

The supporting means may be comprised of one pressure spring or two individual pressure springs with an inertia member arranged between them. The supporting means may also be formed of two bodies resting one atop another, whereby the bodies may be of a cylindrical or parallelepipedal shape. A tension spring may be connected to the bodies for maintaining them in a starting position corresponding to the initial locked position. The supporting means may further be comprised of a freely movable ball resting in a ball socket. It is also possible to provide the supporting means as two levers connected to one another with a joint, with a spring connected to the two levers for maintaining them in a stretched position. In this embodiment, the bearing and the locking means each have a rolling face for free ends of the two levers for facilitating a deflection of this supporting means such that a clamping force exerted by the locking means remains constant during deflection.

The locking means may be an angular lever having a free end resting on the supporting means and being pivotably mounted to the housing. It is also possible, that the locking means comprises a locking lever and a transmission member pivotably connected to one another, whereby the transmission member rests on the supporting means and the locking lever is pivotably mounted to the housing. In another embodiment, the locking means comprises a locking lever, an elbow lever with an elbow joint, and an abutment at the housing, the locking lever being pivotably connected with one end to the housing and pivotably connected with the other end to a first end of the elbow lever. The second end of the elbow lever is pivotably connected to the abutment. The elbow lever rests on the supporting means such that in the initial locking position the supporting means maintains the elbow lever in its starting position. In the starting position the elbow lever is slightly bent, for example, at an angle of 5°. In a further embodiment, a pressure spring is provided and the elbow lever in the starting position is stretched, the pressure spring being connected between the elbow joint and the housing such that it acts on the elbow joint in a direction toward the supporting means.

Furthermore, the supporting means may be comprised of two rollers arranged atop one another, a displaceable roller bearing positioned between the two rollers, and a sensor body connected to the roller bearing. The roller bearing may be in the form of a plate and the sensor body in the form of a cylinder, whereby the bearing has a bore and a sensor spring arranged in the bore. The sensor body is axially displaceable in the bore against an elastic force of the sensor spring.

The supporting means may further be is comprised of a roller and a displaceable roller bearing connected in a slidable manner to the bearing, and a sensor body connected to the roller bearing. As an alternative, the supporting means may be a roller cage and a roller inserted therein, and further a cylindrical sensor body and a push rod. The push rod connects the sensor body to the roller cage. In another embodiment, the supporting means may be comprised of a roller and a cylindrical sensor body, the sensor body having a step for receiving the roller. In all of the embodiments, the bearing has a bore and sensor spring arranged therein as disclosed above.

The invention is based on the general idea that for securing the energy storage means in its resting position a locking lever is provided which rests on a support which is deflectable in the release situation due to occurring acceleration forces and which is prestressed in its locking position. In preferred embodiments the locking lever may be prestressed against an elbow lever whereby the supporting means cooperates with the elbow lever, or the locking lever may be provided in the form of an angular lever with a free end thereof engaging directly the supporting means so that after the deflection of the supporting means a rotation of the locking lever resulting in the release of the mechanical energy storage means occurs. Alternatively, it may be provided that between the locking lever and the support a force-transmitting transmission member cooperating with the locking lever is provided which is engaged by the inventive supporting means.

In as far as in the embodiment of the present invention the support of the locking lever occurs via an elbow lever against the force resulting from the mechanical energy storage means, preferably a pre-stressed spring, then the support is coordinated with the elbow joint and thereby maintains the elbow lever in its resting position. With respect to a fast release of the elbow lever, the elbow lever may be prebent in the direction of the supporting means about an angle of one to five degrees so that after the deflection of the supporting means a respective fast deflection of the elbow lever occurs; alternatively, the elbow lever may also be arranged in a stretched position between the locking lever and an abutment, whereby a further spring is provided which rests at the housing and which loads the elbow joint in the direction of the supporting means.

For the embodiment of the supporting means which may cooperate with either the elbow lever or a locking lever in the form of an angular lever or with the additionally provided transmission member, a number of preferred embodiments are disclosed in this invention. Accordingly, the supporting means may be a single spring, the deflection of which releases the release arrangement.

Alternatively, it is possible to provide two separate springs between which an inertia member is clamped whereby the deflection of the springs is influenced by the magnitude of the inertia mass as well as the spring force and whereby after the sliding of the inertia mass from between the spring arrangement the release action takes place.

As a further alternative of the invention for the embodiment of the supporting means, it is suggested to provide two cylindrical bodies arranged one above the other which are movable relative to one another and are held in their stretched position by a tension spring engaging both cylindrical bodies.

As an alternative it is provided that the supporting means be a freely movable ball arranged in a ball socket connected to the housing whereby the deflection of the ball results in the release of the respective locking lever.

In another alternative it is provided that the supporting means be in the form of two rollers clamped and arranged one above the other with a roller bearing being arranged therebetween for holding the rollers in their initial position; this roller bearing is coupled with a sensor body that is sensitive to accelerations so that upon removal of the roller bearing from its position between the rollers the deflection of the thus embodied supporting means occurs. The same effect may be achieved by employing a single roller which may rest on a roller bearing, the housing or on the sensor body itself.

An alternative embodiment provides two levers connected by a joint as the supporting means whereby their stretched position provides the support for the securement of the energy storage means; a spring ensures the stretched position. A deflection of the levers relative to one another about their joint is caused by acceleration forces resulting from an accident. The threshold for the release may be influenced by changing the spring force. The rolling faces of the two levers and the counter abutment surfaces are chosen such that the position of the locking lever remains unchanged until the release occurs.

Finally, an alternative embodiment provides that the locking lever, respectively, a transmission member connected therewith rests on a pivotable sensor lever having an inertia mass and resting at a clamping device connected to the housing and being maintained in its resting position by a sensor spring. When acceleration forces occur, the sensor lever is pivoted against the action of the sensor spring and releases the transmission member whereby, for the reduction of friction during this step, a roller is provided between the transmission member and the sensor lever.

According to the invention it may be further provided that the respectively arranged elbow lever connections may be replaced by correspondingly arranged angular levers or other lever mechanisms.

BRIEF DESCRIPTION OF THE DRAWINGS

The drawings represent embodiments of the invention which will be described in the following. It is shown in:

FIG. 6 a release device with a ball support,

DESCRIPTION OF PREFERRED EMBODIMENTS

Figure 1:
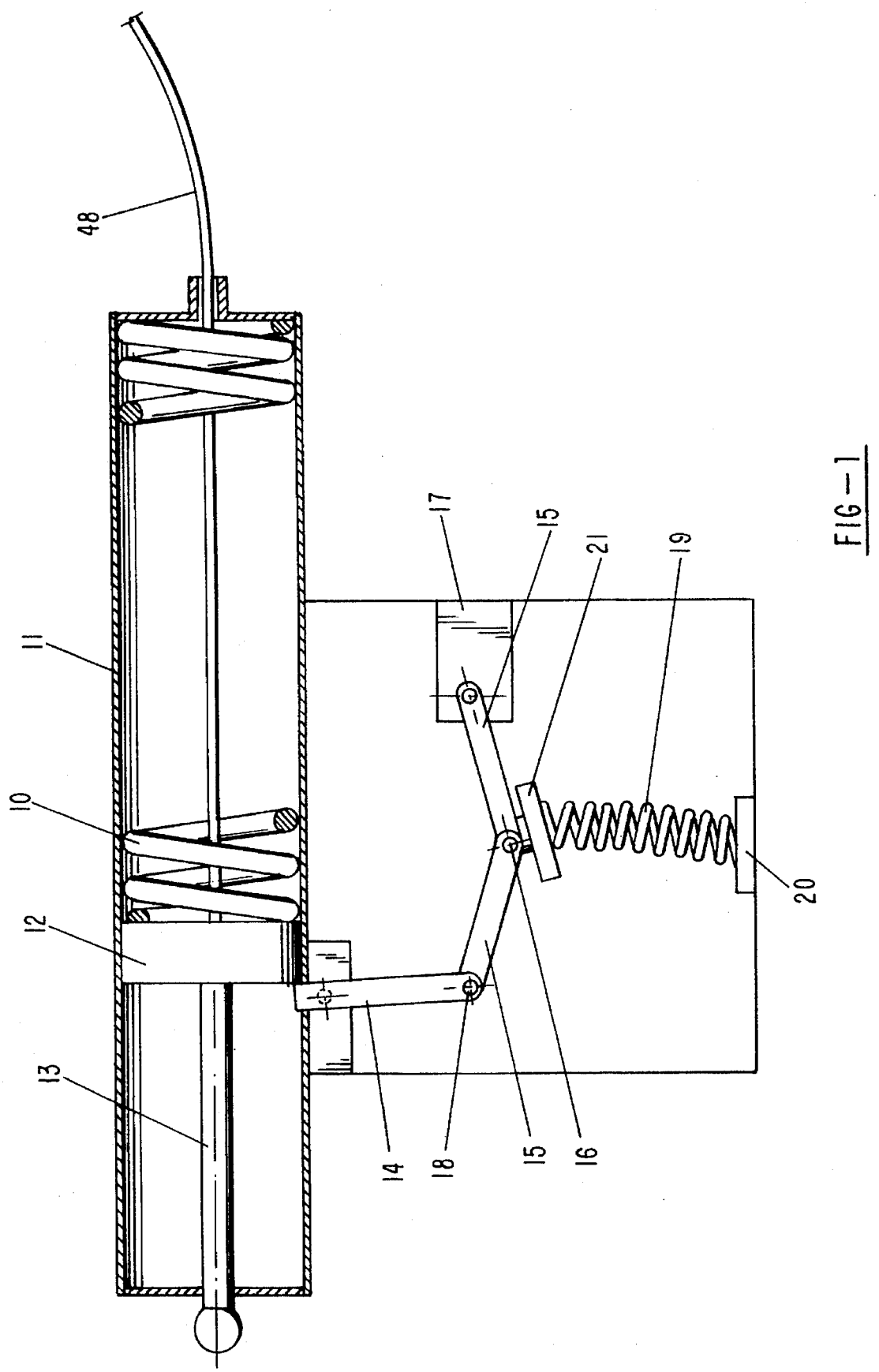
FIG. 1 a release device with a deflection spring.

The Figures respectively represent a spring 10 arranged in a housing 11 which in its prestressed stage acts on a piston 12 with a pull rope 48 whereby the movements of the rope 48 may be used in a plurality of ways for respective tensioning movements within a safety belt device.

A piston rod 13 serves to tension the spring 10 and to guide the piston 12. The spring 10 is maintained and secured in its prestressed position by a locking lever 14 which engages the piston 12 so that a release of the spring 10 is achieved by pivoting the locking lever 14 out of the movement path of the piston 12. Simultaneously, the force of the prestressed spring 10 acts via the piston 12 as a supporting force on the locking lever 14.

In the embodiment shown in FIG. 1, the locking lever 14 rests with its free end with a joint 18 against the elbow lever 15 whereby the elbow lever 15 is supported with its free end at an abutment 17. Between the elbow joint 16 and a spring bearing 20 connected to the housing, a pressure spring 19 is arranged which is prestressed by a spring plate 21. The elbow joint 16 is slightly bent in the direction of the pressure spring 19 which acts as the supporting means so that a respective quick bending action after deflection of the spring 19 occurs.

In the embodiment the spring 10 is maintained in its prestressed position by the locking lever 14. The locking lever is supported at the elbow lever 15 which rests with its joint 16 at the pressure spring 19. The pressure spring is designed such that it is stable to deflections below a predetermined threshold. When an acceleration above the threshold occurs, the spring 19 is subjected to a transverse force due to its inertia forces which results in the deflection of the spring 19 and the release of the elbow lever 15 and the locking lever 14.

Figure 2:
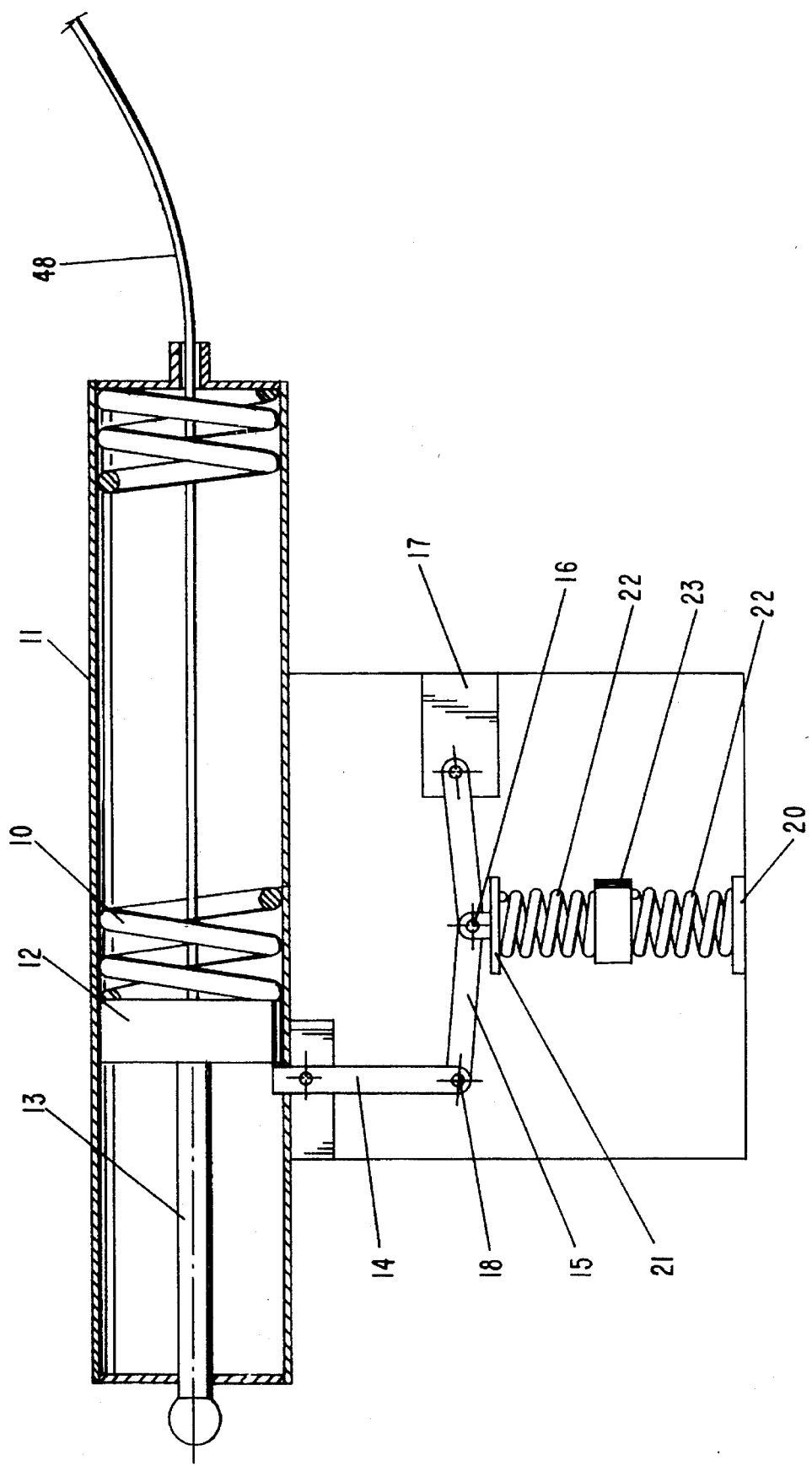
FIG. 2 a release device with deflection spring and inertia member.
Figure 3:
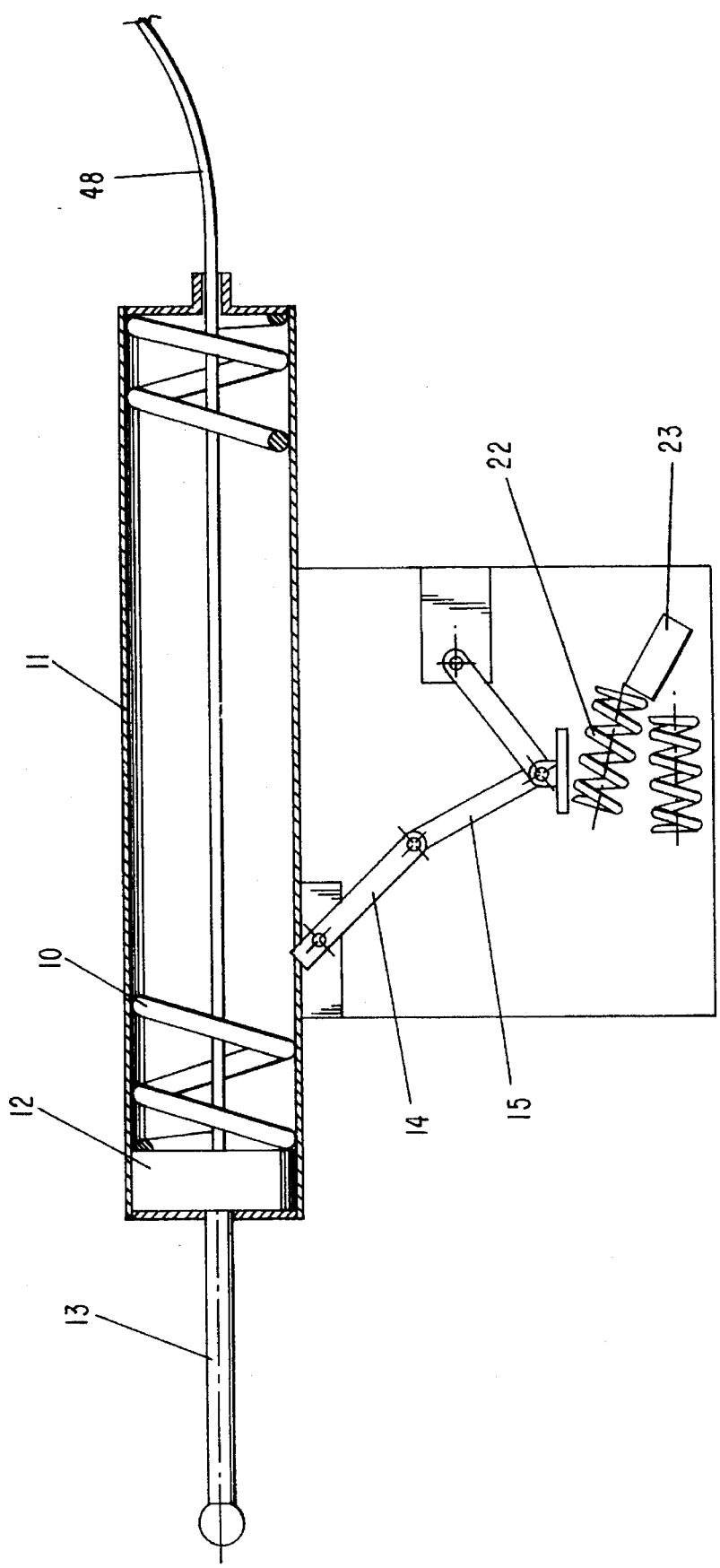
FIG. 3 a release device according to FIG. 2 after release.

As can be seen in FIG. 2, in a further development of the aforedescribed embodiment, the pressure spring may be provided as two separate springs 22 between which an inertia member 23 is arranged; as can be seen in FIG. 3, an occurring acceleration force acting as a transverse force results in the deflection of the inertia member 23 and the deflection of the springs 22 such that the support for the elbow lever 15 is removed.

In the two aforementioned embodiments an adjustment may be provided in addition to the spring bearing 20 in order to compensate for manufacturing tolerances or in order to adjust the threshold value in a more efficient way.

Figure 4:
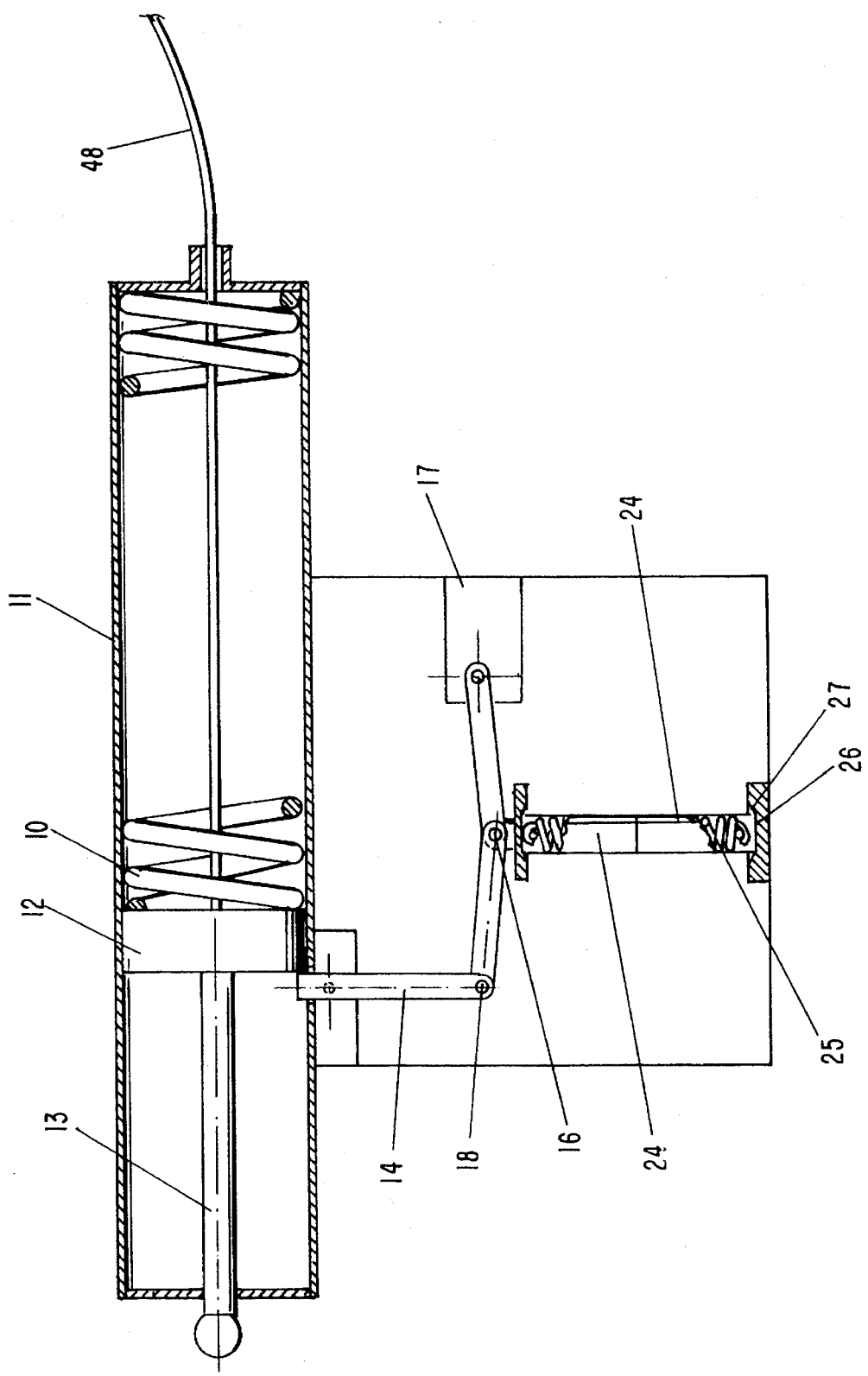
FIG. 4 a release device with deflecting support.
Figure 5:
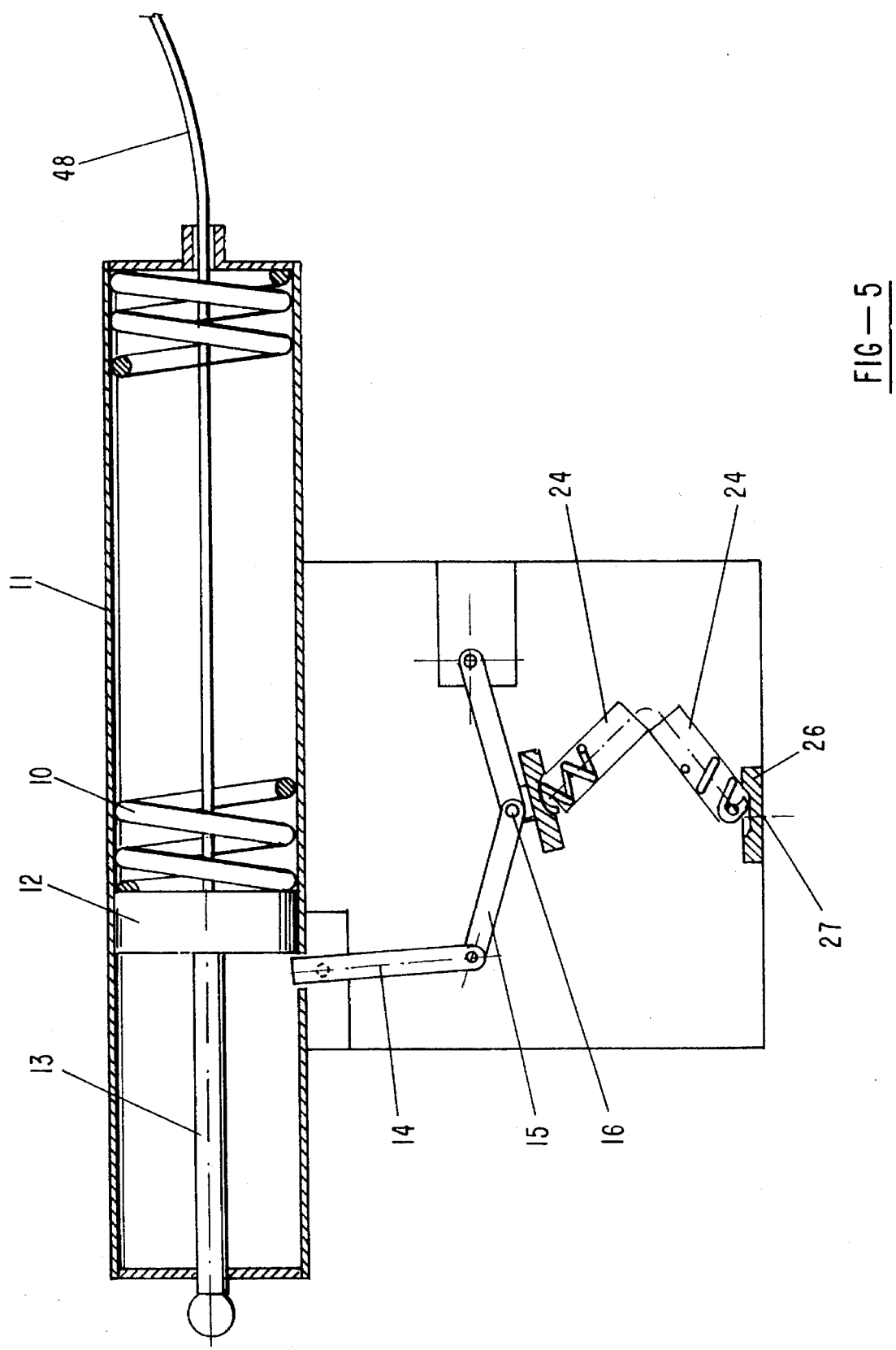
FIG. 5 a release device according to FIG. 4 after release.

FIGS. 4 and 5 show an embodiment of the invention in which the supporting means supporting the elbow joint 16 is comprised of two cylindrical or parallelepipedal bodies resting one atop the other which, in the represented embodiment, are additionally clamped relative to one another by a tension spring. The supporting means 24 rests on a bearing 26 at the housing having a respectively formed recess which defines a tilting edge 27.

When an acceleration force acts transverse to the axis of the cylinder 24, a deflection of the cylinders 24 relative to one another results and the supporting means tumbles as soon as the resulting bending point projects past the tilting edge 27 of the bearing 26. Below the threshold value, the spring 25 serves to reinstate the supporting means, and, furthermore, the sensitivity of this sensor embodiment may be adjusted with the aid of the provided spring 25.

In the embodiment represented in FIG. 6, the elbow joint 16 rests on a freely movable ball 28 which is arranged in a ball socket 29 attached to the housing. For this purpose, the elbow lever 15 is provided with a respectively rounded support surface. In this embodiment, the elbow lever 15 is in a stretched position between the support 18 at the locking lever 14 and the abutment 17 and, in the area of its elbow joint, is loaded by a pressure spring 30 into contact with the ball 28, with the spring 30 being supported at the housing 10.

When acceleration forces act on the ball 28, the ball 28 is deflected in the ball socket 29 and forces the elbow joint 16 against the pressure spring 30; when the occurring acceleration forces remain below the predetermined threshold, the spring 30 maintains the elbow lever 15 in its securing position and forces the ball 28 back into its resting position. When the threshold is surpassed, the elbow joint 16 is forced in an upward direction due to the movement of the ball 28 within the ball socket 29 so that a release of the locking lever 14 results. In this embodiment, it may, of course, also be provided that the elbow lever be bent in a direction toward the ball 28 by an angle of 1 to 5 degrees.

An adjustment possibility in this embodiment is provided by the spring 30; as an alternative a vertical pendulum may be used as the supporting means instead of the ball 28.

Figure 7A:
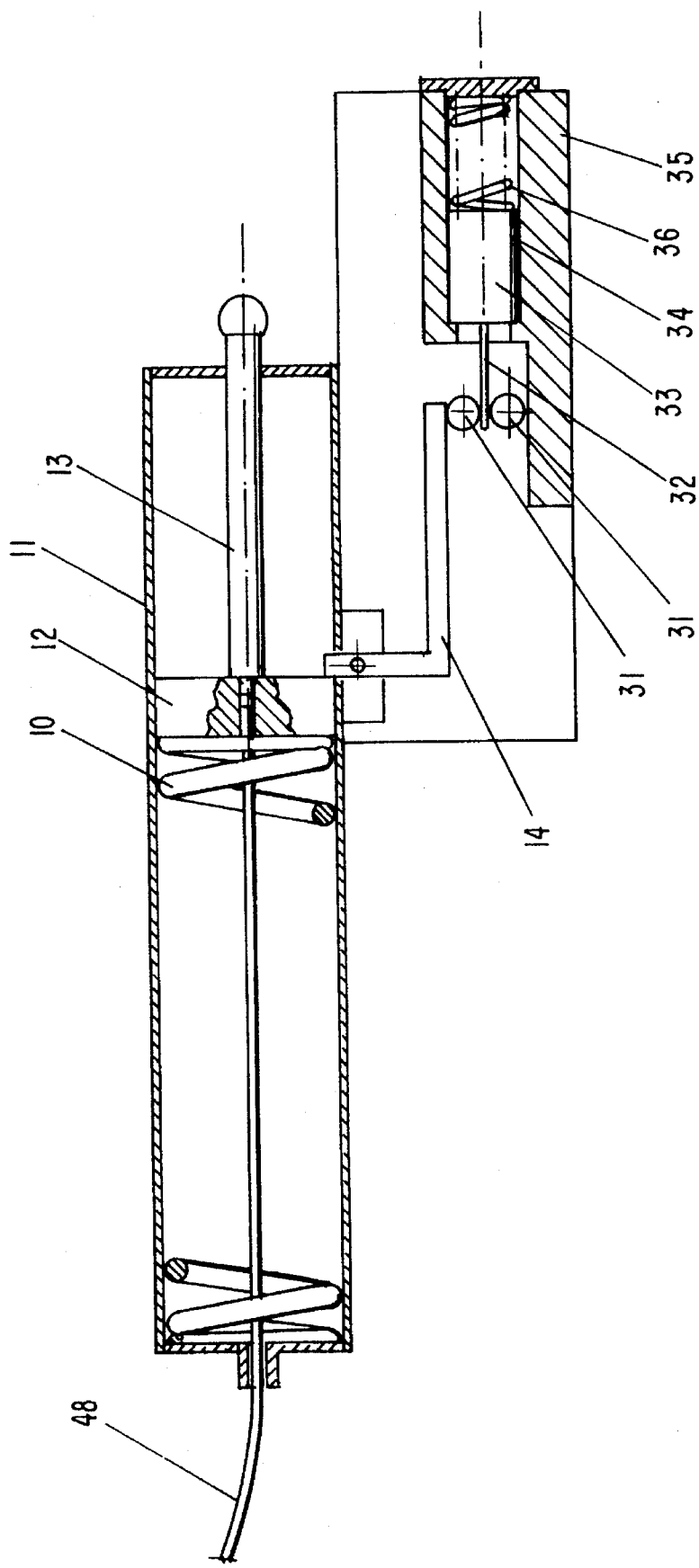
FIG. 7*a* a release device with roller support.

In FIG. 7a an embodiment of the invention is shown in which the locking lever 14 is provided as an angular lever which with its free end rests on the supporting means in the form of two rollers 31 arranged one above the other; the rollers 31 are clamped between a bearing 35 and the lever 14, and between the rollers 31 a roller bearing 32 is arranged which holds the rollers 31 in their respective resting position. The roller bearing 32 is connected to a cylindrical sensor body 33 which is axially guided in a bore 34 of the bearing 35 and movable against the force of a sensor spring 36.

When a movement of the sensor body 33 below the threshold occurs, the sensor spring 36 presses the sensor body 33 back into its resting position so that the system remains stable. When the acceleration forces acting on the sensor body 33 are above the predetermined threshold, the roller bearing 32 is pulled away from its position between the rollers 31 so that the thus formed supporting means collapses and the locking lever 14 is released.

Figure 7B:
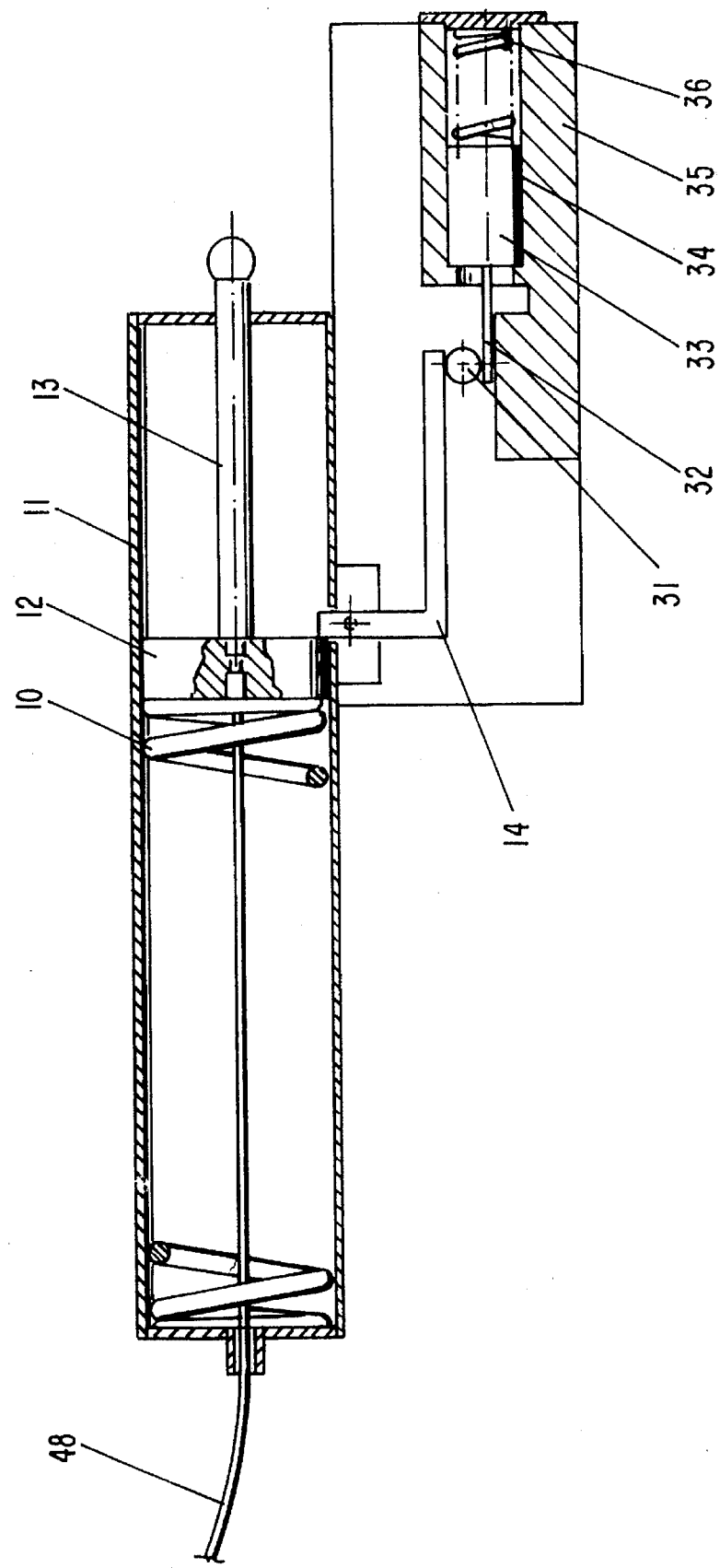
FIG. 7*b*–7*d* further embodiments of a device according to FIG. 7*a*, FIG. 8 a release device with another embodiment of a deflecting support, FIG. 9 the device of FIG. 8 in a released position, FIG. 10 a release device with a sensor lever with inertia mass, FIG. 11 the release device according to FIG. 2 after release.
Figure 7C:
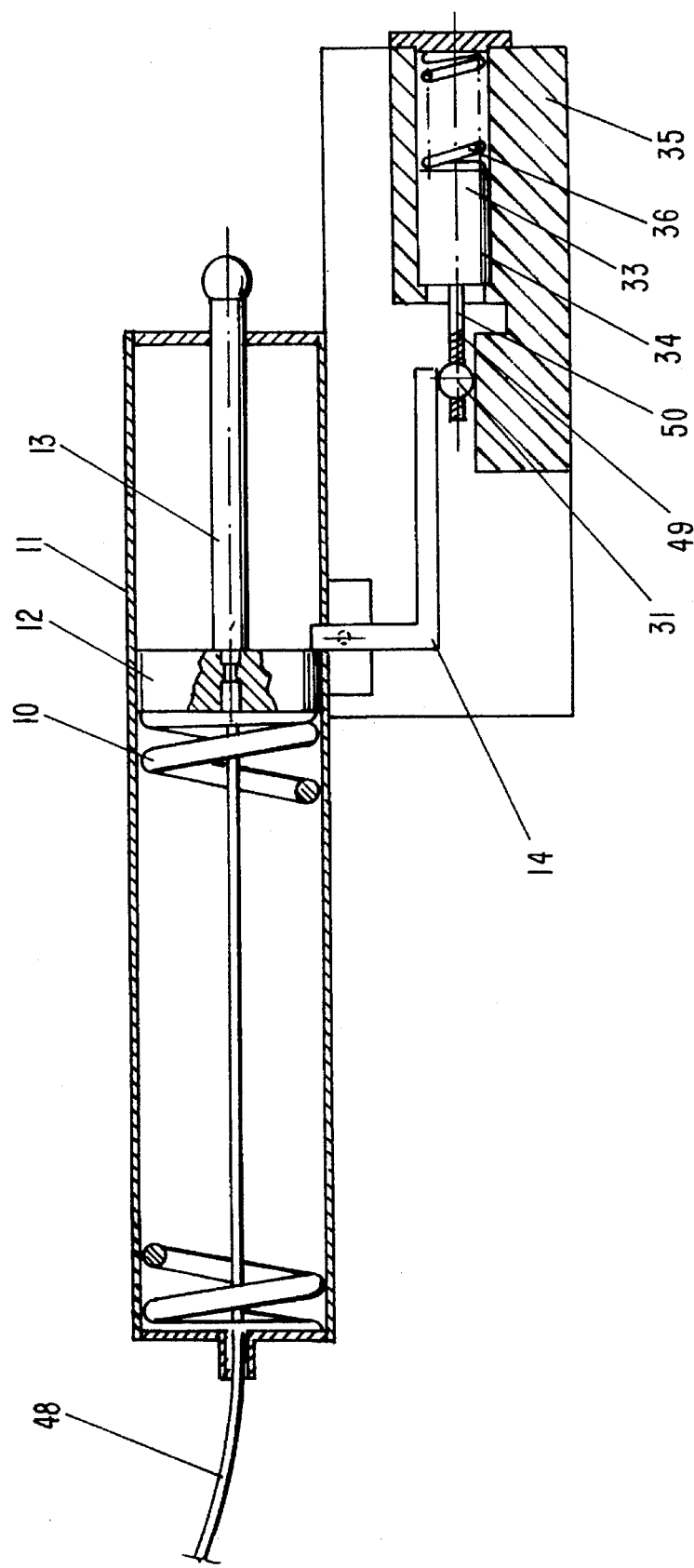
Figure 7D:
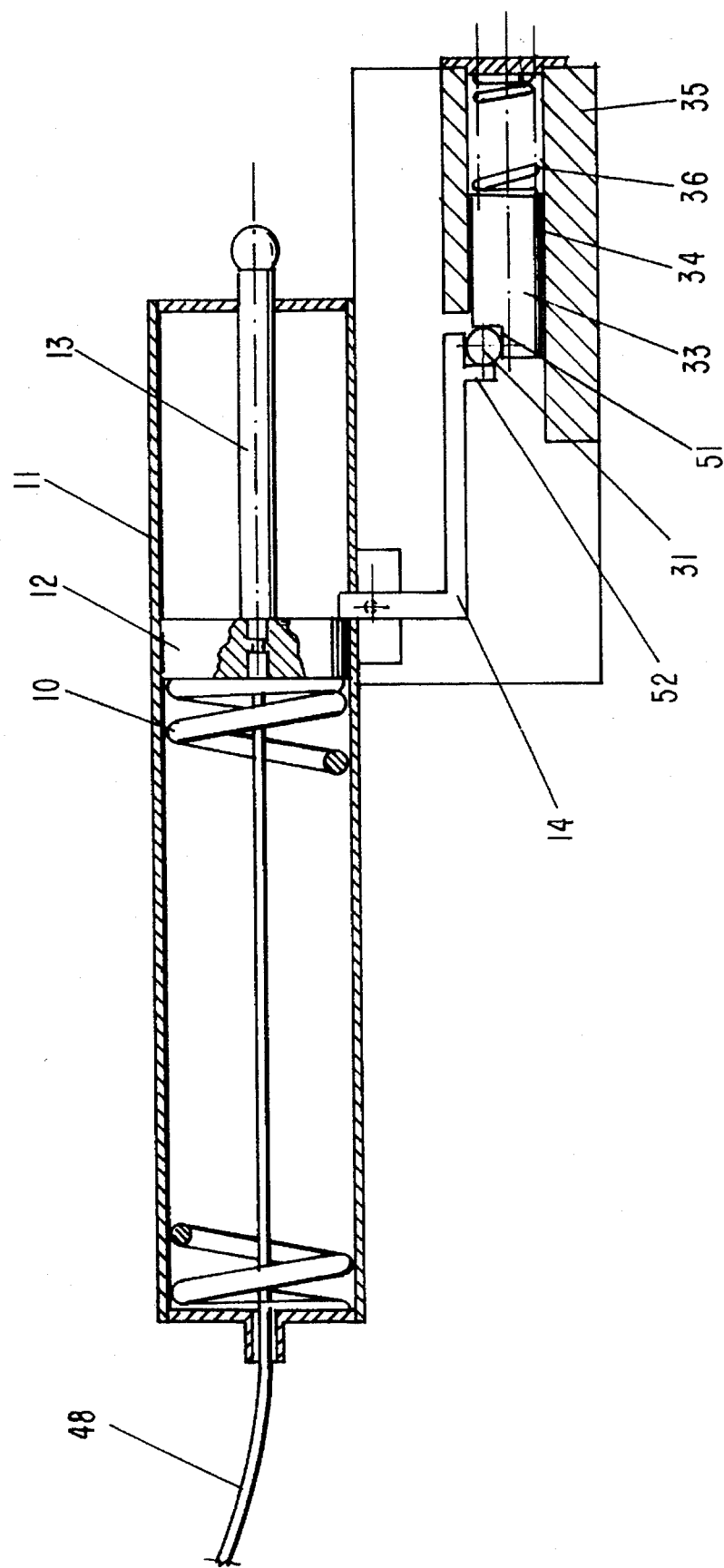

In FIGS. 7b to d further embodiments of the arrangement generally disclosed in FIG. 7a are represented. In the embodiment shown in FIG. 7b, only one roller 31 is provided which is arranged between the locking lever 14 and the roller bearing 32 whereby the roller bearing glides directly at the bearing 35. FIG. 7c shows an arrangement in which a single roller 31 arranged in a roller cage 49 is provided between the locking lever 14 and the bearing 35 such that the sensor body 33 is connected to the roller cage 49 via a push rod 50. From FIG. 7d it may be taken that the roller 31 is directly positioned at the locking lever 14 and the sensor body 33 whereby the sensor body 33 is provided with a step 51 against which the roller 31 is forced by an angular pawl 52 provided at the locking lever 14.

In all embodiments according to FIG. 7b to 7d, the release of the locking lever 14 occurs when the respective roller 31 is moved in the movement direction of the sensor body 33 due to the influence of the sensor body 33 to such an extent that the center point of the roller 31 is below the end of the locking lever 14.

In the embodiment represented in FIGS. 7a to 7d the respective rollers 31 may be replaced by a ball.

Figure 8:
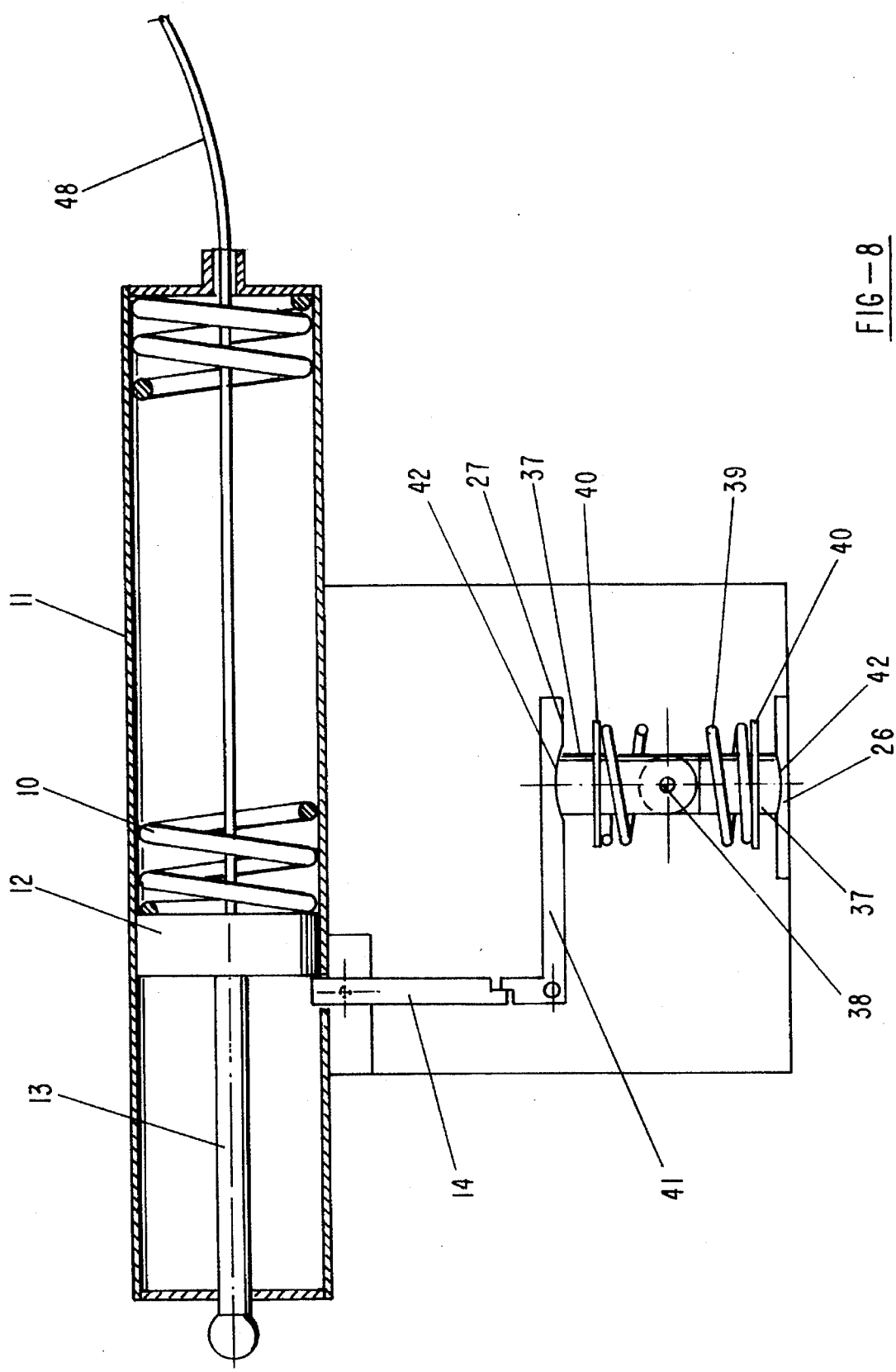
Figure 9:
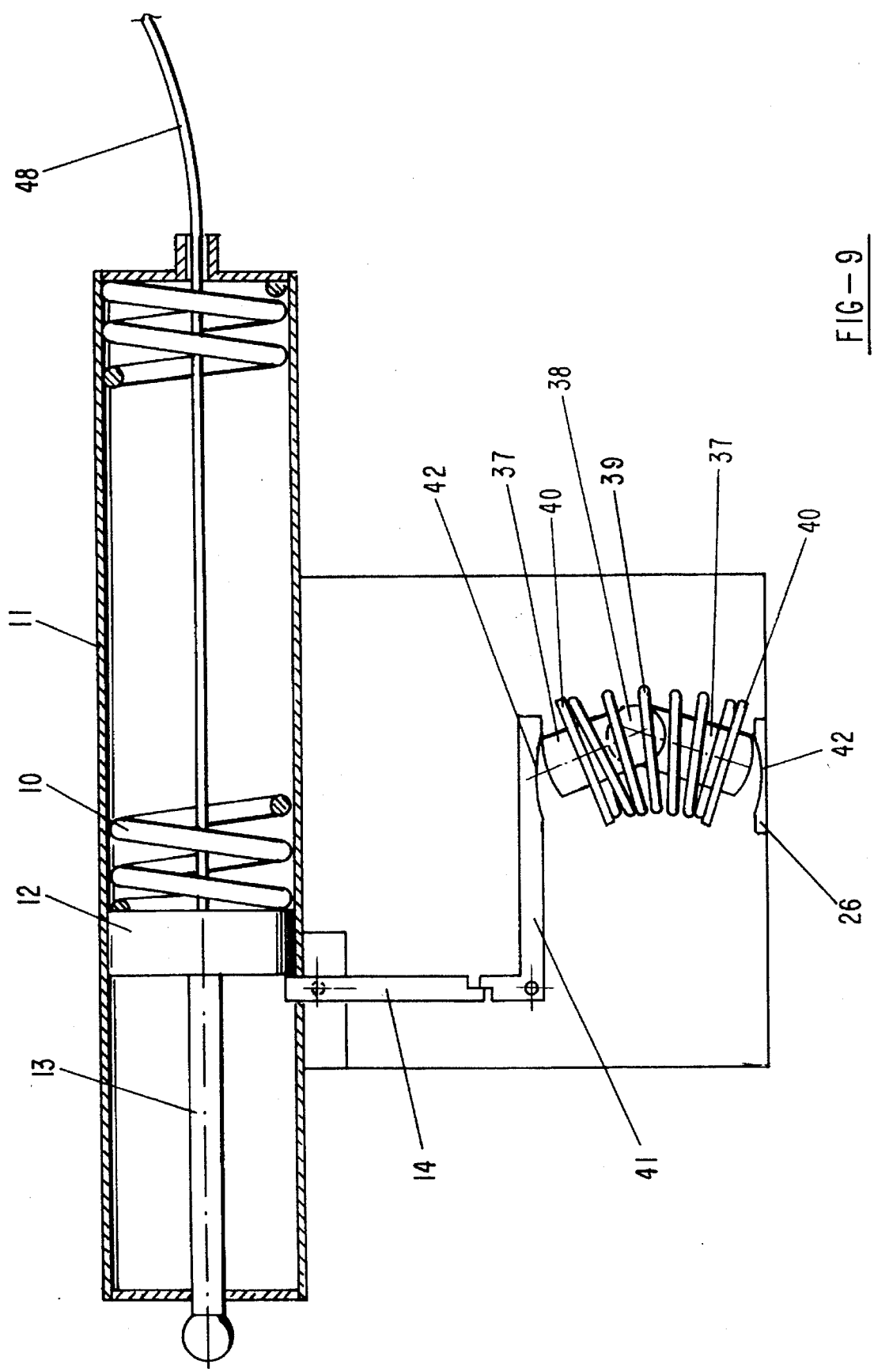

FIGS. 8 and 9 show an embodiment of the invention in which the supporting means for supporting the locking lever is comprised of two levers 37 which are connected to one another by a joint 38. In this embodiment, the supporting means 37 does not engage the locking lever 14 directly but engages a transmission member 41 which cooperates with the locking lever 14; however, a direct engagement of the supporting means 37 with the locking lever 14 according to the embodiment shown in FIG. 7 is possible.

The supporting means comprised of the levers 37 is maintained in a stretched position between the bearing 26 and the transmission member 41 by a spring 39 whereby the tension spring 39 is supported at respective spring bearings 40 of the two levers 37. The bearing 26 as well as the transmission member 41 are provided with rolling faces 42 such that when the levers 37 deflect their total length is unchanged so that in an advantageous manner the transmission member 41 must not be raised against the force of the spring 10 before the final deflection of the supporting means 37.

When in this embodiment an acceleration acts on the levers 37, then the levers 37 start bending whereby the levers 37 roll at the transmission member 41, respectively, the bearing 26 until the joint 38 projects past the tilting edge 27 defined by the outer edge of the levers 37 at the transmission lever 41, respectively, the bearing 26; subsequently, the supporting means comprised of the levers 37 collapses entirely and releases the transmission member 41 and thus the locking lever 14.

Figure 10:
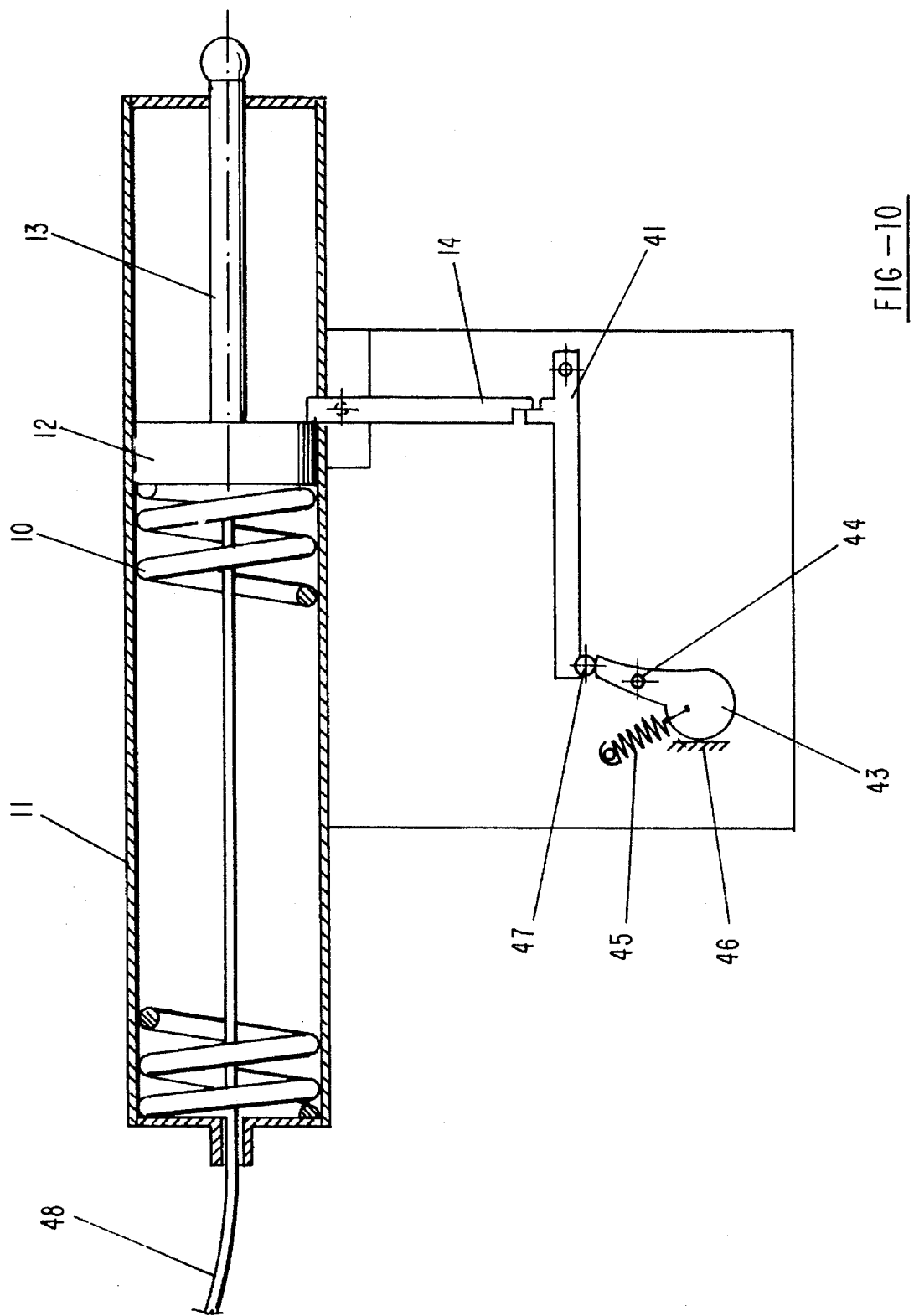

In the embodiment represented in FIGS. 10 and 11, the transmission lever 41 rests at a sensor lever 43 having an inertia mass and being supported at a pivoting axis 44 whereby the bearing is in the form of a roller 47. The sensor lever 43 rests in its resting position against an abutment 46 at the housing and is maintained in this position by a sensor spring 45.

When an acceleration impulse occurs which is below the threshold, the sensor lever may move, however, it is pulled back into its resting position by the sensor spring so that the clamping of the transmission lever 41 is maintained; when the acceleration impulse is greater than the predetermined threshold, then the lever 43 is pivoted to such an extent that the roller bearing 47 is released from the lever 43 so that the transmission member 41 together with the locking lever 14 is released.

The features of the device disclosed in the description, the claims, the abstract and the drawings may be employed individually as well as in any desired combination for the realization of the invention in its various embodiments.

The present invention is, of course, in no way restricted to the specific disclosure of the specification and drawings, but also encompasses any modifications within the scope of the appended claims.

What we claim is:

1. A device for releasing a mechanical energy storage means from an initial locked position in a release situation, said device comprising:

a housing;

a bearing provided at said housing;

a locking means for securing said energy storage means in said initial locked position, said locking means connected to said housing; and a supporting means comprising two bodies positioned one atop the other in a stacked position and deflectable in said release situation, wherein the lower one of said two bodies is connected to said bearing, and further comprising a spring securing said two bodies in said stacked position;

said locking means resting on said supporting means in a prestressed manner in said initial locked position, and said supporting means being deflected in said release situation by forces created by its own inertia.

2. A device according to claim 1, wherein said supporting means is comprised of two levers and a joint, said levers connected to one another with said joint, and further comprised of a spring connected to said two levers for maintaining said two levers in a stretched position, with said bearing and said locking means each comprising a rolling face for free ends of said two levers for facilitating a deflection of said supporting means such that a clamping force exerted by said locking means remains constant during said deflection.

3. A device according to claim 1, wherein said locking means comprises a locking lever and a transmission member pivotably connected to one another, said transmission member resting on said supporting means and said locking lever being pivotably mounted to said housing.

* * * * *

UNITED STATES PATENT AND TRADEMARK OFFICE
CERTIFICATE OF CORRECTION

PATENT NO. : 5,503,037
DATED : April 2, 1996
INVENTOR(S) : Reulein, et. al.

It is certified that error appears in the above-indentified patent and that said Letters Patent is hereby corrected as shown below:

Title page, item [75] inventors: should read--

Hermann Reulein, Pinneberg-Thesdorf;
Alfred Liensdorf, Noderstedt; Bernd
Lacher, Agathorst; Peter Eckmann,
Hamburg; Hans-Otto Kock, Kaltenkirch,
all of Germany--.

Signed and Sealed this

Twenty-second Day of October, 1996

Attest:

BRUCE LEHMAN

*Attesting Officer*          *Commissioner of Patents and Trademarks*